(12) United States Patent
Jun et al.

(10) Patent No.: US 7,532,756 B2
(45) Date of Patent: May 12, 2009

(54) GRAYSCALE CHARACTER DICTIONARY GENERATION APPARATUS

(75) Inventors: Sun Jun, Beijing (CN); Yoshinobu Hotta, Kawasaki (JP); Yutaka Katsuyama, Kawasaki (JP); Satoshi Naoi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 670 days.

(21) Appl. No.: 11/329,407

(22) Filed: Jan. 11, 2006

(65) Prior Publication Data

US 2006/0171589 A1    Aug. 3, 2006

(30) Foreign Application Priority Data

Jan. 11, 2005    (CN)    ......................... 2005 1 0000439

(51) Int. Cl.
*G06K 9/18* (2006.01)
*G06K 9/62* (2006.01)
*G06K 9/34* (2006.01)

(52) U.S. Cl. ....................................... 382/177; 382/209

(58) Field of Classification Search ................. 382/173, 382/177, 181, 182, 185, 186, 188–191, 209, 382/217, 224, 225, 276, 277, 280, 284; 358/3.01, 358/3.06, 1.9
See application file for complete search history.

(56) References Cited

U.S. PATENT DOCUMENTS

| | | | | |
|---|---|---|---|---|
| 4,945,351 A | * | 7/1990 | Naiman | ....................... 345/589 |
| 5,579,407 A | * | 11/1996 | Murez | ......................... 382/164 |
| 5,911,013 A | | 6/1999 | Taniishi | |
| 6,266,445 B1 | * | 7/2001 | Krtolica et al. | ............. 382/209 |
| 6,678,414 B1 | * | 1/2004 | Loce et al. | ................... 382/209 |
| 7,034,963 B2 | * | 4/2006 | Klatchko et al. | ........... 358/3.01 |
| 7,373,008 B2 | * | 5/2008 | Clouthier et al. | ............ 382/245 |
| 2006/0171589 A1 | * | 8/2006 | Jun et al. | .................... 382/185 |

OTHER PUBLICATIONS

Wang et al., "A Gray-Scale Image Based Character Recognition Algorithm to Low-quality and Low-resolution Images," Proceedings of SPIE, vol. 4307, 2001, pp. 315-322.

Yoshimura et al., "Gray-scale Character Recognition by Gabor Jets Projection," Proc. ICPR, 2000, pp. 335-338.

(Continued)

*Primary Examiner*—Amir Alavi
(74) *Attorney, Agent, or Firm*—Staas & Halsey LLP

(57) ABSTRACT

A grayscale character dictionary generation apparatus, comprising a first synthetic grayscale degraded character image generation unit for generating first synthetic grayscale degraded character images using binary character images inputted therein; a clustering unit for dividing each category of the first synthetic grayscale degraded character images generated by the first synthetic grayscale degraded character image generation unit into a plurality of clusters; a template generation unit for generating template for each of the clusters; a transformation matrix generation unit for generating transformation matrix in relation to each of the templates; and a second synthetic grayscale degraded character dictionary generation unit for obtaining character feature of every grayscale degraded character of each of the clusters using the transformation matrix, and for constructing eigenspace of each category of the synthetic grayscale degraded character, which is the second synthetic grayscale character dictionary.

10 Claims, 5 Drawing Sheets

OTHER PUBLICATIONS

Sun et al., "Low Resolution Character Recognition by Dual Eigenspace and Synthetic Degraded Patterns," Proceedings of the 1st ACM Hardcopy Document Processing Workshop, 2004, pp. 15-22.

Duda et al., "Principle Component Analysis (PCA), Pattern Classification (Second Edition)," A Wiley-Interscience Publication, 2001, pp. 115-117 and 568-569.

Zhang et al., "A Novel Face Recognition System Using Hybrid Neural and Dual Eigenspaces Methods," IEEE Transactions on Systems, Man, and Cybernetics, vol. 32, 2002, pp. 787-793.

Richard O. Duda et al., "Pattern Classification," A Wiley-Interscience Publication, 2001, pp. 550-557.

* cited by examiner ame # GRAYSCALE CHARACTER DICTIONARY GENERATION APPARATUS

FIELD OF THE INVENTION

The present invention relates to a grayscale character dictionary generation apparatus.

BACKGROUND OF THE ART

It has long been a big challenge in the field of automatic character recognition to recognize degraded machine-printed characters (character blurrings that may be caused by many reasons, such as low resolution character images, dithering of a digital camera, faxing or repeated scanning, etc.). Traditional methods usually use binary character images for dictionary generation, in which binarization means the value range of the pixels of an image can be only selected either as 0 and 255 or 0 and 1. However, for a degraded character image, binarization usually loses lots of useful information capable of effectively recognizing the information of that character for classification. With the loss of these lots of useful information, correct recognition is impossible even by man, due for example to binarization of the character '日' as '11'; that is to say, even if this '11' is to be recognized by man, it will not be recognized as the result of the binarized character '日'. Since character recognition is a mechanism mimicking man, a computer would never make correct recognition to the extent a man could not recognize, thereby causing grave consequences for subsequent recognition effect. In view of the fact that the value of the pixels of a grayscale character image is 0~255, with the range of variation lying at 256, whereas a binarization image value is 0~1, a grayscale character image can better retain the recognition information of a character, possess better representation of the image and contain more detailed information. Thus, it is essential in degraded character recognition to use grayscale images to generate a grayscale character dictionary. A grayscale dictionary is one directly constructed by grayscale character images. One problem of grayscale character dictionary generation is how to collect the character samples for dictionary making, since the number of character categories of oriental languages (Chinese, Japanese, and Korean) is very large. For example, a typical Japanese dictionary contains 4299 categories including Kanji, numerals, Katakana, Hiragana and symbols. Traditional dictionaries use binary character images obtained by a scanner. Collecting grayscale images can also be done via grayscale scanning by a scanner, but the grayscale character images required for making a grayscale character dictionary are much more than the binary character images required for making a binary character dictionary. Thus, manual collection is next to impossible.

Many methods have been so far proposed for degraded grayscale character image recognition, such as:

X. W. Wang, X. Q. Ding and C. S. Liu, "A gray-scale image based character recognition algorithm to low-quality and low-resolution images." Proceedings of SPIE Vol. 4307, pp. 315-322.

Yoshimura, H., Etoh, M., Kondo, K., et al. "Gray-scale character recognition by gabor jets projection." Proc. ICPR pp. 335-338, 2000.

Additionally, there is also patent related method of frequency-based feature extraction, such as U.S. Pat. No. 5,911,013, "Character recognition method and apparatus capable of handling handwriting", submitted in Jun. 8, 1999 by the inventor Shinnosuke Taniishi.

However, for degraded grayscale character images, only frequency-based methods can not get very good result because they cannot effectively distinguish detailed features of a character, and are hence defective in recognizing similar characters.

SUMMARY OF THE INVENTION

The present invention is proposed in view of the prior art defects as discussed above, and its object is to provide a grayscale character dictionary generation apparatus, which generates 2 dictionaries to be used during the process of recognition, wherein the first dictionary is based on frequency-analysis and is used for coarse classification, and the second dictionary performs optimal reconstruction of the results of the coarse classification, and then carries out fine classification thereof.

To achieve the aforementioned object, this invention provides a grayscale character dictionary generation apparatus, which comprises a first synthetic grayscale degraded character image generation unit for generating first synthetic grayscale degraded character images using binary character images inputted therein; a clustering unit for dividing each category of the first synthetic grayscale degraded character images generated by the first synthetic grayscale degraded character image generation unit into a plurality of clusters; a template calculation unit for generating template for each of the clusters in the plurality of clusters of each category of the synthetic grayscale degraded character images; a transformation matrix generation unit for generating transformation matrix in relation to each of the templates; and a second synthetic grayscale degraded character dictionary generation unit for obtaining character feature of every grayscale degraded character of each of the clusters using the transformation matrix, and for constructing eigenspace of each category of the synthetic grayscale degraded character, which is the second synthetic grayscale character dictionary.

Preferably, the grayscale character dictionary generation apparatus further comprises a second synthetic grayscale degraded character image generation unit for generating a plurality of second synthetic grayscale degraded character images using the first synthetic grayscale degraded character images in one or more clusters among the plurality of clusters generated by the clustering unit, when the number of the synthetic grayscale degraded character images in the one or more clusters is less than a predetermined value, so that the number of the synthetic grayscale degraded character images in the one or more clusters is equal to or more than the predetermined value.

Preferably, the clustering unit divides the plurality of clusters using a hierarchical clustering method.

The grayscale character dictionary generation apparatus can further comprise a first synthetic grayscale degraded character dictionary generation unit for linear transformation of the template of each of the clusters using the transformation matrix to generate a first synthetic grayscale character dictionary.

The grayscale character dictionary generation apparatus can further comprise an input unit for inputting binary character images into the first synthetic grayscale degraded character image generation unit.

The first synthetic grayscale degraded character image generation unit includes a degradation level estimation unit, for estimating degradation levels of the synthetic characters required to be generated, with different degradation levels corresponding to different degradation extents; and a degraded grayscale character generation unit, for generating synthetic grayscale degraded character images corresponding to each of the degradation levels respectively for each of the inputted binary character images.

Preferably, the number of degradation levels is 3 or 4.

Preferably, the transformation matrix generation unit generates the transformation matrix using Principal Component Analysis method.

Preferably, the second synthetic grayscale degraded character dictionary generation unit constructs eigenspace of each category of the synthetic grayscale degraded character using Principal Component Analysis method.

As discussed above, if samples are not collected enough, the effect of a dictionary thus made will be generally weak in recognition; and since sample collection is a tedious and complicated work, it is usually impossible to obtain enough samples. This invention is capable of automatic generation of a great number of grayscale character samples, besides that, this invention makes use of a new dictionary making method, which is better in recognition performance as compared with conventional algorithm.

BRIEF DESCRIPTION OF THE DRAWINGS

Drawings are provided for further comprehension of this invention. The drawings explain the embodiments of this invention, and are incorporated into the Description to make up a part of the Description and illustrate the principles of this invention together with the Description.

SPECIFIC EMBODIMENTS FOR CARRYING OUT THE INVENTION

The present invention uses synthetic grayscale character images to generate grayscale character dictionary. In this invention, a first synthetic grayscale character image generation unit is firstly used to generate a plurality of synthetic grayscale degraded character images according to each of the binary character images inputted from outside; each category of the character in these synthetic grayscale degraded character images is then clustered; a template is calculated with regard to each cluster, and PCA (Principal Component Analysis) is performed on all the templates to obtain a transformation matrix. The transformation matrix is used to obtain feature of each synthetic grayscale degraded character by its functioning on each synthetic grayscale degraded character, and then, Principal Component Analysis is performed again on the features of each category of all the synthetic grayscale degraded characters, so as to obtain a second grayscale degraded character dictionary. There is preferably included a step of generating the first grayscale degraded character dictionary by the transformation matrix functioning on each template. Additionally, when the number of samples in each cluster is less than a predetermined value; a second synthetic grayscale character image generation unit is used to augment the number of samples of each category and then a second grayscale character dictionary corresponding to each category character is generated using the synthetic grayscale character images generated by the first grayscale character image generation unit and the second grayscale character image generation unit.

The preferred embodiments of this invention are described in detail below in combination with the accompanying drawings.

Figure 1:
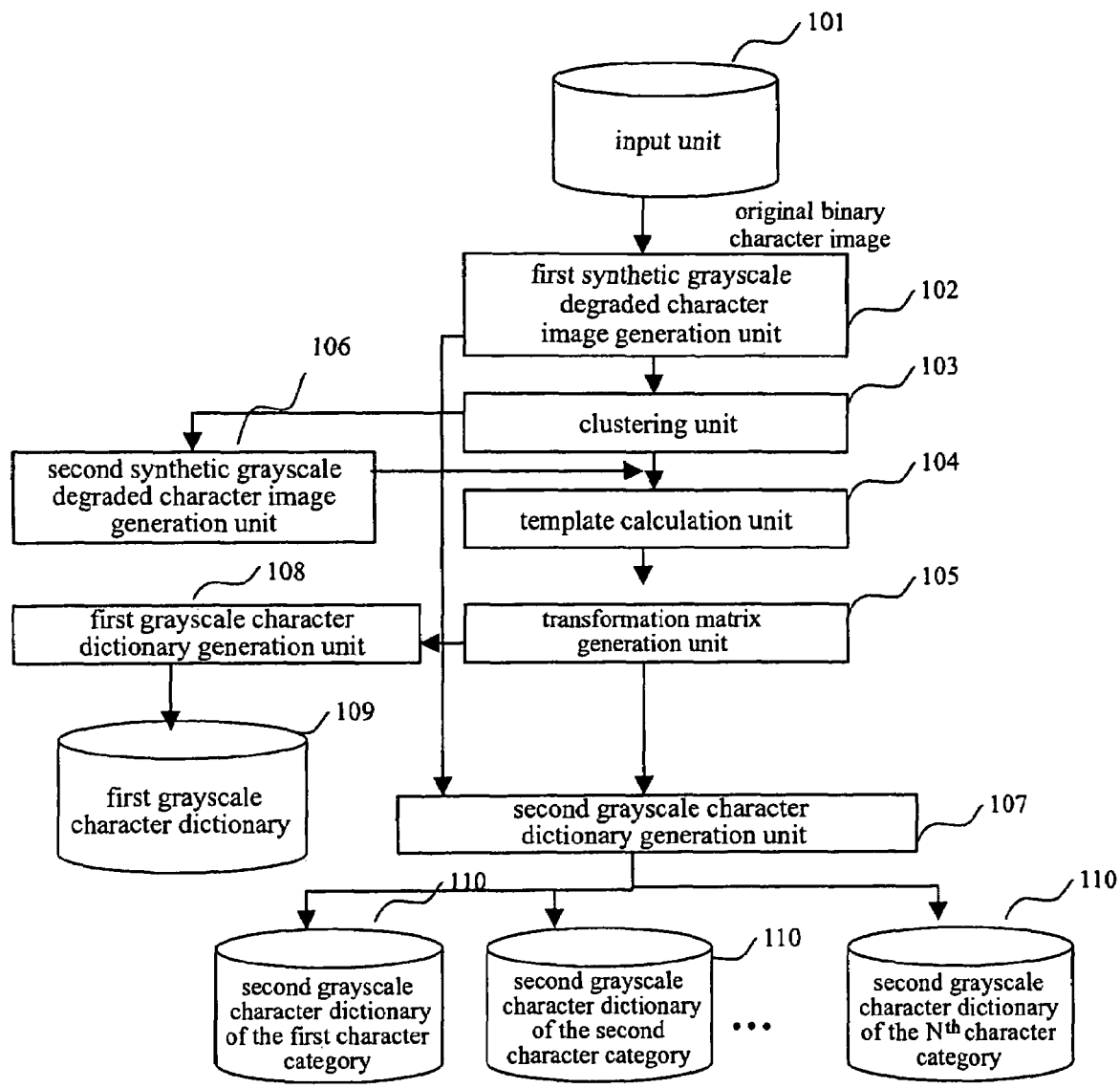
FIG. 1 is a holistic flowchart of the present invention.

FIG. 1 is a holistic flowchart of the present invention. AS shown in FIG. 1, a binary character image 101 constituted by N category character is inputted by an input device 101. The classification of characters is carried out according to the shapes and meanings of the characters, for example, there are 3755 Kanji, and hence there are 3755 categories; at the same time, although the symbol '-' looks similar to the Chinese character '—', the two denote different meanings, and hence belong to two different categories. Taking for another example, the English letters have 52 categories (including the letters both in small and in capital forms). In each category of a character, different fonts respectively correspond to different binary images. After passing the first synthetic grayscale character image generation unit 102, each inputted binary character image is generated a plurality of synthetic grayscale degraded character images. Because the object to be recognized is the actual degraded character image, such as a blurring character and small character, it is hence necessary to make the dictionary by using a similar blurring character. The input unit 101 here can be a scanner, a camcorder, and/or a camera etc., or can be a PDA (Personal Digital Assistant) storing binary character images, a remote computer on the net, and/or a server etc., for inputting actual binary images. The input unit can also be a computer module for automatic output of ideal binary character images. These are already known in the art. Synthetic grayscale degraded character images are generated in the first synthetic grayscale character image generation unit 102. The first synthetic grayscale character image generation unit 102 will be described in detail in combination with FIG. 2. After generation of the grayscale degraded character images, a clustering unit 103 clusters each category of the generated first synthetic grayscale character images. Then, template calculation unit 104 calculates templates for each of the generated clusters. Subsequently, a transformation matrix generation unit 105 performs analysis using the Principal Component Analysis method and generates transformation matrix.

In addition, when the number of the synthetic grayscale degraded characters (the number of samples) of one or more clusters of a cluster generated by the clustering unit 103 is less than a predetermined value, the second synthetic grayscale degraded character generation unit generates the second synthetic grayscale degraded characters for this cluster to set the number of samples in this cluster greater than or equal to the predetermined value, and then the template calculation unit calculates templates for this cluster.

The operations of each of the units are described in detail below.

Figure 2:
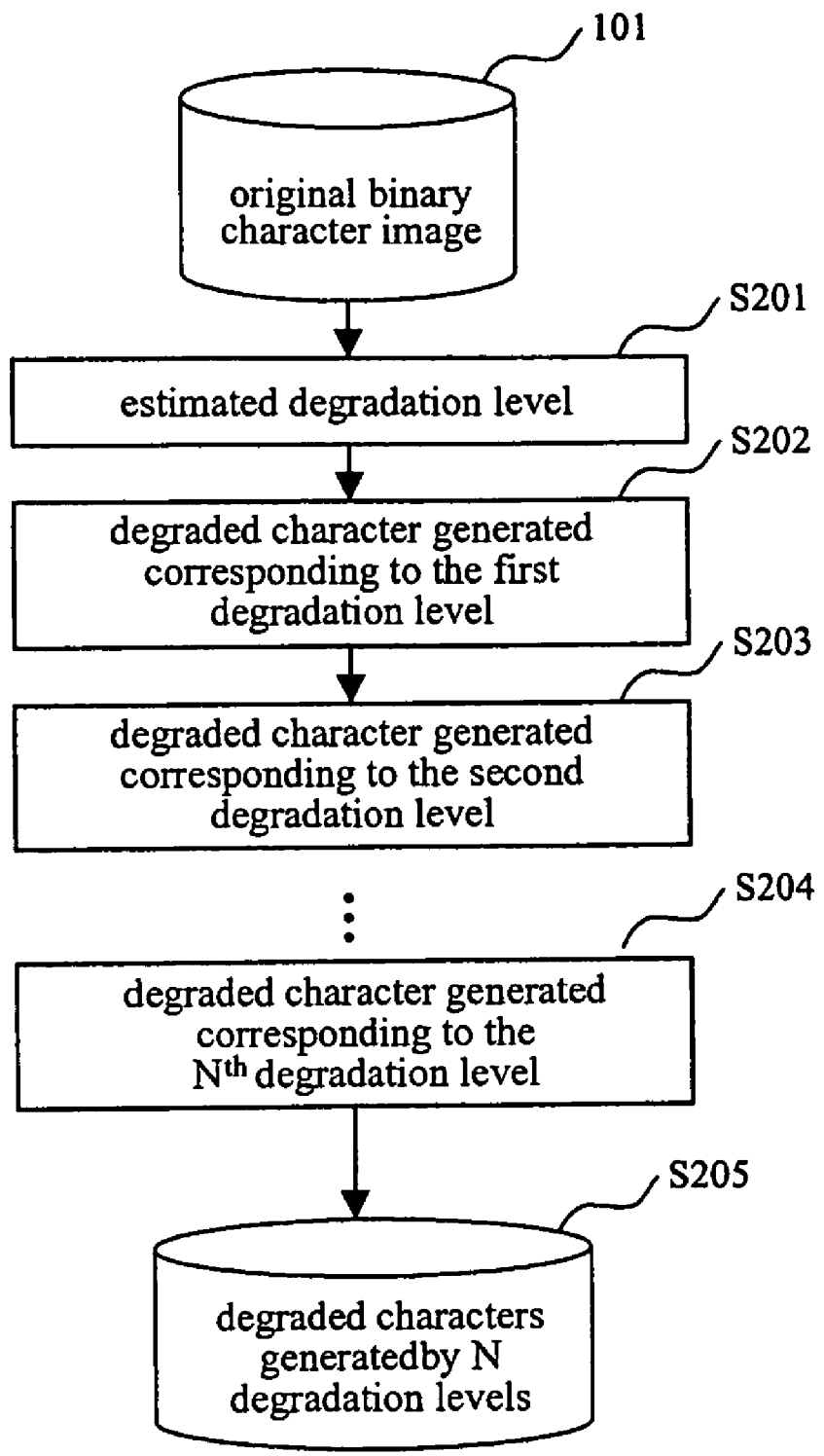
FIG. 2 is a flowchart of the first synthetic character generation.

FIG. 2 shows the operational flow of the first synthetic grayscale character image generation unit 102. As shown in FIG. 2, degradation levels are firstly estimated by the degradation level estimation unit (not shown) in the first synthetic grayscale character image generation unit 102. The input of the degradation level estimation unit is the size of the actual character of the character image to be recognized, and the output thereof is the degradation levels to be estimated, which are used to generate synthetic grayscale degraded character images. Provided the size of the actual character (the actual degraded character image to be recognized, i.e. testing sample) is 20*20, if the degradation level is given at 3, the three degradation levels can be set at 12*12, 20*20 and 28*28. Here, the degradation level can be determined by the size of the actual testing sample: if the size is relatively small, 4 levels are needed, otherwise 3 levels will suffice; 12*12 is relevant to the actual size of the testing sample: provided there are 3 levels, the degree of the second level is set as the actual size of the character, the degree of the first level is less than the degree of the second level by k, and the degree of the third level is greater than the degree of the second level by k, where k=8. If the degradation level is given at 4, the second level is set at 16*16, the third level 24*24, the fourth level 32*32, the first level 8*8, and so on. Suppose the size of the original binary character image (the sample used in making the dictionary, i.e., a training sample) is 64*64, the generation of the synthetic grayscale degraded character image can be realized by shrinking the image of 64*64 to 12*12, 20*20 and 28*28, respectively, and then amplifying back to 64*64. Although the size of the image does not change before as well as after the transformation, three images respectively represent the different degradation levels. In recognizing low resolution characters, N can be either 3 or 4. If resolution is high enough (the size of the character is large enough), recognition can be done by conventional binary features. Then in each of the degradation levels, synthetic grayscale degraded character images are generated that respectively correspond to each binary character image(S202~S204). There are many algorithms for generating synthetic grayscale degraded character images, of which the simplest algorithm is to compress the original binary image into a miniscule grayscale image, and then amplify it to its former size. This method pertains to the prior art, for reference of which see as follows:

J. Sun, Y. Hotta, Y. Katsuyama, S. Naol, 'Low resolution character recognition by dual eigenspace and synthetic degraded patterns'. Proceedings of the $1^{st}$ ACM Hardcopy Document Processing Workshop, pp. 15~22 2004, Washington DC.

Degraded grayscale images can also be generated by such methods as Gauss-filtering the original image, etc.

Figure 5:
FIG. 5 shows the degraded grayscale character images corresponded by the degradation levels as estimated by the degradation level estimation unit.
Figure 5:
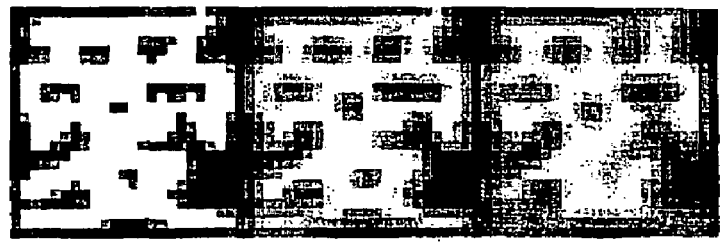

That is, suppose the size of the original binary character image (a known binary image used in making the dictionary) is 64*64 pixels, N=3, and recognition size for the low resolution character (i.e., the character image to be handled) is 20*20 pixels, the compression size of the first level, the second level and the third level will be respectively 12, 20 and 28. The output of unit 102 is a series of synthetic grayscale degraded character images (S205) that correspond to N degradation levels. FIG. 5 is an example showing the inputted binary character and the outputted first synthetic grayscale degraded character images corresponding to the degradation levels.

Figure 3:
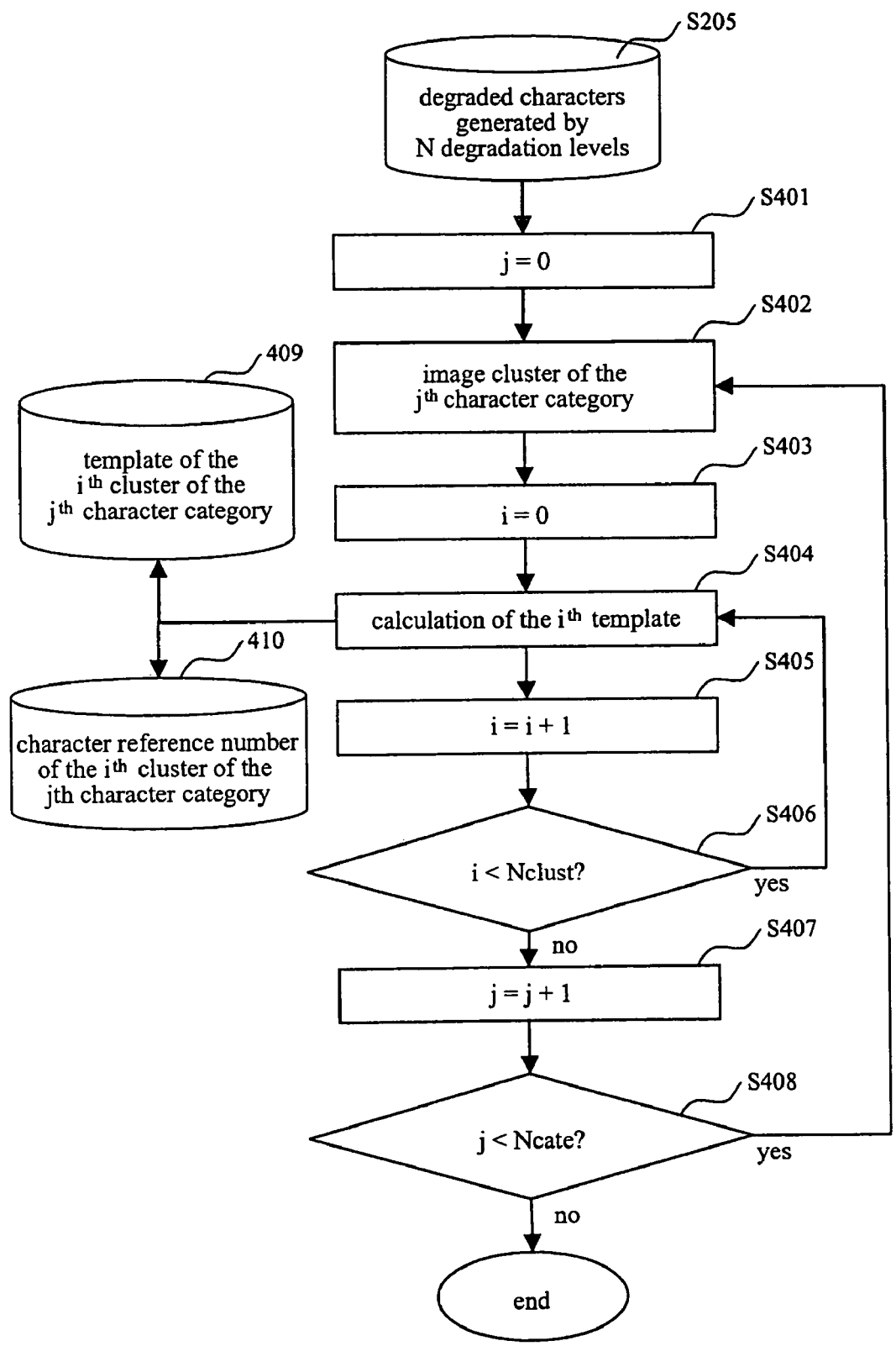
FIG. 3 is a flowchart of cluster and template generation.

FIG. 3 is an example showing the process of cluster and template generation. As shown in FIG. 3, the clustering unit divides each category of the synthetic grayscale degraded character image into Nclust clusters. For the $j^{th}$ category (representing the $j^{th}$ category in N character categories, j=1, 2, ... ,N)characters (S401), an image clustering algorithm is used to cluster them into Nclust clusters (S402). In "Pattern classification" (second edition by R. O. Duda, P. E. Hart and D. G. Stork. A Wiley-lnterscience Publication John Wiley & Sons, Inc. 2001. pp. 550-557), there is listed an example of the clustering algorithm: Hierarchical clustering method. It is firstly supposed in this method that each sample respectively forms a cluster; since the number of the samples is greater than the number of the predetermined clusters, it is hence necessary to incorporate the results of the initial clusters; and during each process of the incorporation, the two categories closest to each other are incorporated together. The process of category incorporation repeats itself until the number of the categories after the incorporation is equal to the predetermined number of clusters.

After the clustering step of the synthetic grayscale degraded character images, all character images are divided Into Nclust clusters. And then, step (S404) is performed for template calculation, that is to say, the template calculation unit 104 is used to obtain template 409 of each cluster, which is obtained by the mean value of all the samples in each cluster. This template is the mean image of all the character images belonging to each cluster, i.e., the mean character image (409) of all the character images in this cluster. The character indexes in this cluster are recorded as another term, which is a separate output 410. For instance, there are 10 characters before clustering, the character indexes will be 1~10; if these are clustered into two categories, the character indexes of the first category may be 1, 3, 7, 8, 9 and the character indexes of the second category will be 2, 4, 5, 6, 10. This process repeats itself (S403~S408) with regard to each cluster of each character category until all the templates are generated.

Figure 4:
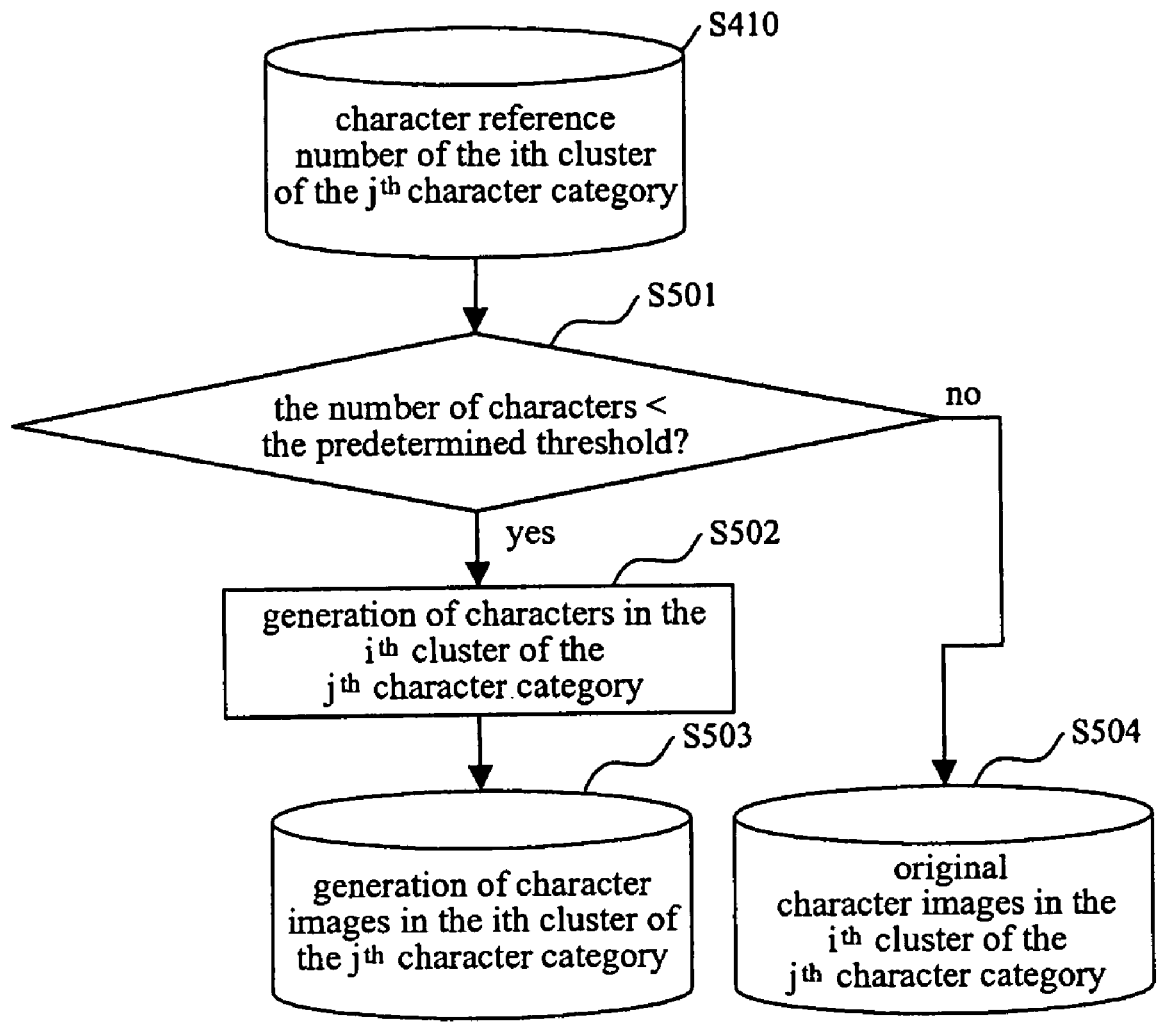
FIG. 4 is a flowchart of the second synthetic character generation.

In addition, although N degraded character images are generated by the first synthetic grayscale character image generation unit corresponding to each original binary character image, some of the clusters generated by the clustering unit 103 sometimes contain only few samples. Such clusters are generally special types in this character category, and if the number of samples in such a character category is not enough, the character recognition effect will be reduced. Accordingly, there is provided the second synthetic grayscale character image generation unit to augment the number of character samples of each character category. In other words, in step S402 if the number of samples of the clusters generated is less than a predetermined value, the second synthetic grayscale character image generation unit is then used to augment the number of character samples of each character category. FIG. 4 shows the specific flow procedure of the second synthetic grayscale character image generation unit.

As shown in FIG. 4, for character images in the $i^{th}$ cluster of the $j^{th}$ category (S410), if the number of character samples Is less than a given threshold Tchar, a character generation unit (S502) is used to generate synthetic grayscale degraded character images from the data in that cluster. The detailed steps for generating synthetic grayscale degraded character images are as follows:

Suppose the number of characters in the $i^{th}$ cluster of the $j^{th}$ category is Nc:

1. If Nc>=Tchar, wherein Tchar is the predetermined value, output the character images in the $i^{th}$ cluster of the $j^{th}$ category and the process ends. Otherwise execute the following steps:
2. Calculate the number of patterns, Np, generated for every sample in the cluster whose number of samples is less than Tchar, by the following formula:

Np=(Tchar+Nc−1)/Nc

3. Generate Np synthetic grayscale degraded character images corresponding to each character in the cluster.

Np synthetic grayscale character images can be realized by performing shrinking-amplifying operation on the original grayscale character images. Provided, for example, the degree of the original image is 64*64, the first synthetic grayscale character image can be obtained by shrinking the original image to 63*63, and then amplifying it to 64*64, the second synthetic grayscale character image can be obtained by shrinking the original image to 62*62, and then amplifying it back to 64*64, . . . , and the Np synthetic grayscale character image can be obtained by shrinking the original character image to 64−Np*64−Np, and then amplifying it to 64*64. If Np is greater than 64, the degree of the original character is first amplified to 128*128, and then shrunken back.

4. Output Np*Nc synthetic grayscale character images as the final output. After the step of the second synthetic grayscale character image generation, the number of samples in all the clusters is greater than Tchar. The aforementioned operation is performed on all the character categories. After cluster template calculation has been completed, as shown in FIG. 1, transformation matrix is generated by the transformation matrix generation unit 105. This can be done by performing PCA (Principal Component Analysis) on all the templates of all the categories. By the use of the Principal Component Analysis, the distribution of these templates in higher dimension space can be obtained. This distribution can be represented by a transformation matrix obtained by the Principal Component Analysis. A=[$a_1$, $a_2$, ..., $a_m$]. The method of the PCA (Principal Component Analysis) can be referred to in the book by R. O. Duda, P. E. Hart and D. G. Stork, "Pattern classification" (second edition. A Wiley-Interscience Publication John Wiley & Sons, Inc. 2001. pp. 115~117, 568~569).

After the transformation matrix has been generated, the generations of the first grayscale character dictionary and the second grayscale character dictionary can be proceeded.

The generation of the first grayscale character dictionary is firstly introduced. The transformation matrix is firstly used to perform linear transformation on each template (to be explained in detail in the following paragraphs). Templates generated by each character category construct the first level eigenspace of all the character images, namely the first level dictionary.

The steps of constructing the first level dictionary are described in detail below.

Suppose $X_{ij}=[x_1^{ij}, x_2^{ij}, \ldots, x_n^{ij}]^T$ represents the $i^{th}$ template in the $j^{th}$ category characters, where n stands for the number of pixels in the template image, A=[$a_1$, $a_2$, ..., $a_m$] is the principal component matrix obtained in S302, and $a_i$ is an n*1 vector representing the $i^{th}$ principal component. The $i^{th}$ feature vector for the $j^{th}$ category is then obtained by:

$$F_{ij}=A^T(X_{ij}-\mu)$$

where $$\mu = \frac{\sum_{i=1}^{N_{cate}} \sum_{j=1}^{N_{clust}} X_{ij}}{N_{cate} * N_{clust}}$$

is the mean vector of all templates.

Wherein "T" stands for transposition of the vector, which is used here to represent $X_{ij}=[x_1^{ij}, x_2^{ij}, \ldots, x_n^{ij}]^T$. It is a column vector. Ncate stands for the number of categories, and is the N previously mentioned. Nclust stands for the number of clusters of each category.

Since there are Nclust templates in each character category, there are correspondingly Nclust feature vectors in the first grayscale character dictionary of each character category.

The purpose of the first grayscale character dictionary thus generated is for coarse classification: for an inputted character image to be determined of its category, linear transformation obtained by PCA is first used to transform this character image in order to obtain the feature of this character, which is then compared with the features of all the templates in the first grayscale character dictionary to output M most similar categories. Since no single category is determined in this step, it is hence referred to as coarse classification. The subsequent second level dictionary determines the final category on the basis of the results of the coarse classification.

In order to get a better recognition effect, this invention makes use of the second grayscale character dictionary generation unit 107 to establish a second grayscale character dictionary for each character category.

The specific steps are as follows:

1. A step of extracting character feature. Suppose the $i^{th}$ character image in the $j^{th}$ category is defined as $G_{ji}=[g_1^{ji}, g_2^{ji}, \ldots, g_n^{ji}]^T$. The feature of the character is obtained by the following formula:

$$f_{ji}=A^T(G_{ji}-\mu_j),$$

where $\mu_j$ is the mean character image of the $j^{th}$ category.

2. A step of constructing eigenspace. Features, $f_{ji}$, of all the character images in the $j^{th}$ category, including all the samples generated in the first synthetic grayscale character image generation unit and the second synthetic grayscale character image generation unit are used to construct the eigenspace of that character category. PCA is used to analyze features of all the character images belonging to the same character category (including features of the grayscale degraded character images generated by the first synthetic grayscale character image generation unit and the second synthetic grayscale character image generation unit) to obtain the distribution of these features in higher dimension space, and a linear transformation matrix is used to represent this distribution. The linear transformation matrix corresponded by each category is the second grayscale character dictionary.

As discussed above, if samples are not collected enough, the effect of a dictionary thus made will be generally weak in recognition; and since sample collection is a tedious and complicated work, it is usually impossible to obtain enough samples in the state of the art. This invention is capable of automatic generation of a great number of grayscale character samples, besides that, this invention makes use of a new dictionary making method, which is better in recognition performance as compared with conventional algorithm.

It is obvious that a person skilled in the art may make various revisions and variations to the present invention without departing from the principle or scope of this invention. Consequently, if these revisions and variations made to this invention fall within the scope of the appended claims and their equivalents, they shall be covered by this invention.

The invention claimed is:

1. A grayscale character dictionary generation apparatus, comprising:
   a 1st synthetic grayscale degraded character image generation unit for generating a plurality of 1st synthetic grayscale degraded character images using binary character images inputted therein;
   a clustering unit for dividing each category of the 1st synthetic grayscale degraded character images generated by the 1st synthetic grayscale degraded character image generation unit into a plurality of clusters;
   a template calculation unit for generating template for each of the clusters;
   a transformation matrix generation unit for generating transformation matrix in relation to each of the templates;
   a 2nd synthetic grayscale degraded character dictionary generation unit for obtaining character feature of every grayscale degraded character of each of the clusters using the transformation matrix, and for constructing eigenspace of each category of the synthetic grayscale degraded character, which is the 2nd synthetic grayscale character dictionary.

2. The grayscale character dictionary generation apparatus according to claim 1, further comprising:

a 2nd synthetic grayscale degraded character image generation unit for generating a plurality of 2nd synthetic grayscale degraded character images using the 1st synthetic grayscale degraded character images in one or more clusters among the plurality of clusters generated by the clustering unit, when the number of the synthetic grayscale degraded character images in the one or more clusters is less than a predetermined value, so that the number of the synthetic grayscale degraded character images in the one or more clusters is equal to or more than the predetermined value.

3. The grayscale character dictionary generation apparatus according to claim 1, wherein the clustering unit divides the plurality of clusters using a hierarchical clustering method.

4. The grayscale character dictionary generation apparatus according to claim 1, further comprising:

a 1st synthetic grayscale degraded character dictionary generation unit for linear transformation of the template of each of the clusters using the transformation matrix to generate a 1st synthetic grayscale character dictionary.

5. The grayscale character dictionary generation apparatus according to claim 4, wherein the 1st synthetic grayscale degraded character image generation unit includes:

a degradation level estimation unit, for estimating degradation levels of the synthetic characters required to be generated, with different degradation levels corresponding to different degradation extents; and, a degraded grayscale character generation unit, for generating synthetic grayscale degraded character images corresponding to each of the degradation levels respectively for each of the inputted binary character images;

the transformation matrix generation unit generates the transformation matrix using Principle Component Analysis method;

the 2nd synthetic grayscale degraded character dictionary generation unit constructs eigenspace of each category of the synthetic grayscale degraded character using Principle Component Analysis method.

6. The grayscale character dictionary generation apparatus according to claim 1, further comprising:

an input unit for inputting binary character images into the 1st synthetic grayscale degraded character image generation unit.

7. The grayscale character dictionary generation apparatus according to claim 1, wherein the 1st synthetic grayscale degraded character image generation unit includes:

a degradation level estimation unit, for estimating degradation levels of the synthetic characters required to be generated, with different degradation levels corresponding to different degradation extents; and a degraded grayscale character generation unit, for generating synthetic grayscale degraded character images corresponding to each of the degradation levels respectively for each of the inputted binary character images.

8. The grayscale character dictionary generation apparatus according to claim 7, wherein the number of degradation levels is 3 or 4.

9. The grayscale character dictionary generation apparatus according to claim 1, wherein the transformation matrix generation unit generates the transformation matrix using Principal Component Analysis method.

10. The grayscale character dictionary generation apparatus according to claim 1, wherein the 2nd synthetic grayscale degraded character dictionary generation unit constructs eigenspace of each category of the synthetic grayscale degraded character using Principal Component Analysis method.

* * * * *